United States Patent [19]
Larson

[11] Patent Number: 5,756,633
[45] Date of Patent: May 26, 1998

[54] SILYL TERMINATED SULFOPOLY(ESTER-URETHANE) COMPOSITIONS

[75] Inventor: Wayne K. Larson, Maplewood, Minn.

[73] Assignee: Minnesota Mining and Manufacturing Company, St. Paul, Minn.

[21] Appl. No.: 609,193

[22] Filed: Mar. 1, 1996

Related U.S. Application Data

[60] Provisional application No. 60/000,954 Jul. 7, 1995.

[51] Int. Cl.$^6$ .................................................. C08G 18/61
[52] U.S. Cl. ........................... 528/28; 528/30; 528/49; 525/453; 428/423.1; 428/423.7; 428/425.1; 428/425.6; 428/425.8
[58] Field of Search .................... 528/28, 30, 49; 525/453; 428/423.1, 423.7, 425.1, 425.6, 425.8

[56] References Cited

U.S. PATENT DOCUMENTS

| | | | |
|---|---|---|---|
| 3,941,733 | 3/1976 | Chang | 260/29.2 |
| 4,012,114 | 3/1977 | Eigenmann | 350/104 |
| 4,150,946 | 4/1979 | Neel et al. | 8/115.6 |
| 4,307,219 | 12/1981 | Larson | 528/71 |
| 4,558,149 | 12/1985 | Larson | 560/14 |
| 4,746,717 | 5/1988 | Larson | 528/68 |
| 4,855,384 | 8/1989 | Larson | 528/60 |
| 5,554,686 | 9/1996 | Frisch et al. | 524/588 |

FOREIGN PATENT DOCUMENTS

| | | |
|---|---|---|
| 0163214 | 12/1985 | European Pat. Off. . |
| WO/A/94/13723 | 6/1994 | WIPO . |

*Primary Examiner*—Rachel Gorr
*Attorney, Agent, or Firm*—Gary L. Griswold; Walter N. Kirn; Lorraine R. Sherman

[57] ABSTRACT

Water-dispersible sulfopoly(ester-urethane) compositions which comprise, in their backbone, at least one arylene or alkylene sulfonic acid group or a salt thereof, the polymer being terminated by at least one hydrolyzable silyl group. The compositions of the invention preferably have a sulfonate equivalent weight of about 500 to about 12,000 g/equivalent and a number average molecular weight less than 50,000. Compositions of the invention have utility as durable treatments such as low surface energy coatings that exhibit release towards adhesive materials, grease, and oils.

20 Claims, No Drawings

SILYL TERMINATED SULFOPOLY(ESTER-URETHANE) COMPOSITIONS

CROSS-REFERENCE TO RELATED APPLICATION

This application claims priority to U.S. Provisional Patent Application No. 60/000.954, filed Jul. 7, 1995.

FIELD OF THE INVENTION

The present invention relates to water dispersible sulfopoly(ester-urethane) compositions having at least one sulfo-organic segment. Compositions of the invention have utility as durable treatments such as low surface energy coatings that exhibit release towards adhesive materials, grease, and oils.

BACKGROUND OF THE INVENTION

Surface treatments for polar surfaces which demonstrate durability or substantivity toward aqueous challenges are desirable but are often difficult to achieve. Such treatments are particularly desirable for hydroxy functional surfaces such as, for example, siliceous surfaces or cellulosic surfaces, where it is desirable to achieve the treatments without adversely impacting the visual properties of the surface.

Aqueous solvent dispersible linear sulfopolyurethane resins prepared from hydrophilic and hydrophobic diols have been disclosed in U.S. Pat. No. 4,307,219. Hydrophilic sulfopolyurethanes and sulfopolyureas are disclosed in U.S. Pat. Nos. 4,558,149, 4,746,717, and 4,855,384.

SUMMARY OF THE INVENTION

Briefly, the present invention provides water-dispersible sulfopoly(ester-urethane) compositions which comprise, in their backbone, at least one arylene or alkylene sulfonic acid group or a salt thereof, the polymer being terminated by at least one hydrolyzable silyl group. The compositions of the invention preferably have a sulfonate equivalent weight of about 500 to about 12,000 g/equivalent.

In a further aspect, the invention comprises aqueous dispersions comprising up to 60 percent by weight of the sulfopoly(ester-urethane) compositions and 40 or more weight percent solvents such as water or aprotic solvents (e.g., methylethyl ketone, acetone) and optional adjuvants in amounts suitable for their intended use.

In a still further aspect of the invention, a process for the preparation of the sulfopoly(ester-urethane) compositions of the invention is provided.

In yet another aspect of the invention, self-supporting films, fibers, and molded articles of the sulfopoly(ester-urethane) compositions are provided.

In this application:

"arylene or alkylene sulfonic acid group or salt thereof" means a group comprising at least one aromatic or aliphatic group substituted by at least one sulfonic acid group or a salt thereof, "at least one hydrolyzable silyl group" means a silicon atom substituted with one or more alkoxy groups, at least one of which groups can be hydrolyzed to a silanol group;

"catenary" means in the main chain or backbone such as the oxygen in an ether but not the oxygen in a carbonyl group;

"fluorochemical segment" means an organic group comprising at least one segment containing a pendant fluoroaliphatic group having at least four fully fluorinated carbon atoms and at least one urethane/urea group, the group preferably comprising up to 20 carbon atoms;

"group" means the specified moiety or any group containing the specified moiety (as by substitution or extension) that does not adversely affect the composition;

"higher alkylene group" means an alkyl group having 5–30 carbons;

"higher alkylene segment" means an organic group comprising at least one segment containing $C_{12}-C_{30}$ alkyl pendent groups and at least one urethane/urea group; "hydrophilic segment" means an aryl group comprising a pendant sulfonic acid group or salt thereof;

"hydrophobic group" means an organic group comprising at least one hydrolyzable silyl group; "hydrophobic segment" means an organic group comprising at least one of a polysiloxane segment, a higher alkyl segment, and a fluorochemical segment;

"lower alkyl group" means an alkyl group having 1 to 4 carbon atoms;

"molecular weight" means the sum of the atomic weights of all atoms in a group of atoms or in a segment of a polymer and under circumstances where the group or segment may be a mixture of two or more groups or segments is the number average of molecular weights of the groups or segments;

"polymer" includes oligomers;

"random polymer" means like groups can be located at various points along the polymer backbone and not similarly sequenced;

"sulfopoly(ester-urethane)" means a symmetric or assymetric polymer or random polymer comprising at least one sulfo group, at least one ester group and at least one urethane group, optionally containing other functional groups such as urea and thiocarbamate;

"urethane/urea" means an oligomer or polymer comprising urethane or urea groups or a combination thereof.

DETAILED DESCRIPTION OF PREFERRED EMBODIMENTS OF THE INVENTION

The present invention provides water-dispersible poly (ester-urethane-urea) compositions comprising, in their backbone, one or more randomly disposed arylene or alkylene sulfonic acid groups or salts thereof, the polymer being terminated by at least one hydrolyzable silyl group. Coatings of the poly(ester-urethane-urea) compositions of the present invention or articles formed from the compositions can have low surface energy surfaces that exhibit release characteristics toward adhesive materials, grease, and oils.

The sulfopoly(ester-urethane) compositions of the invention comprises polymers having the structural formula:

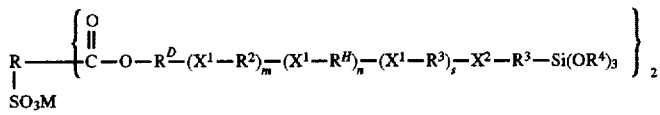

wherein

R can be a $C_6$–$C_{12}$ aryltriyl or $C_1$–$C_{20}$ aliphatic triyl group(trivalent aryl or aliphatic group) in which M is a cation, preferably M is Na, but M can be H, an alkali metal such as K, Li, an alkaline earth metal cation (e.g., Mg, Ca, or Ba), or a primary, secondary, tertiary, or quaternary ammonium cation such as ammonium, methylammonium, butylammonium, diethylammonium, triethylammonium, tetraethylammonium, and benzyltrimethylammonium cation; preferably when R is aliphatic it is an alkylene group;

can be, for example, but not limited to:

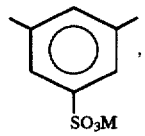

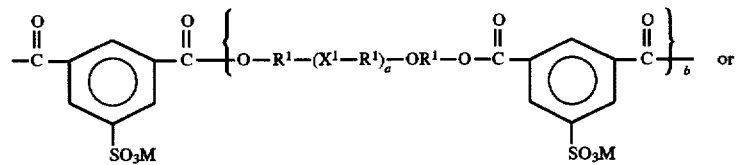 or

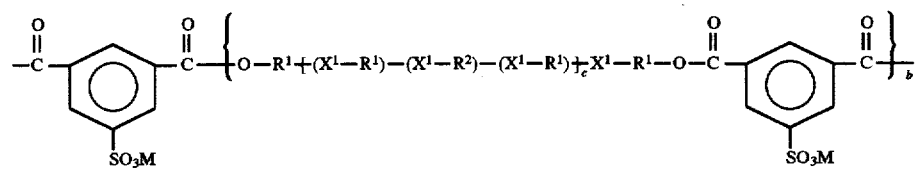

wherein $R^1$, $R^2$, $R^D$, $R^H$, $R^3$, $R^4$, and $R^5$ are defined below, except additionally, $R^1$ may also comprise an oligomeric segment, such as, for example, a polyester or a polylactone segment, m=0 or 1, n=0 or 1, s=0 or 1, with the proviso that independently, one of m or n must be equal to 1, a can be a number 1 to 10, b can be a number 0 to 4, c can be a number 1 to 15.

The skilled artisan will recognize that the values for a, b, and c can vary over a broad range, depending on the molecular weight of the $R^1$ and $R^2$ segments. The important factor in determining the value of these variables is the sulfonate equivalent weight of the final poly(ester-urethane) molecule, which should fall in the range of 500 to 12,000 g/eq. Generally speaking, the values of a and c will be larger when lower molecular weight $R^1$ (and $R^2$) segments are utilized and they will be smaller when oligomeric $R^1$ segments are utilized.

RD can be 1) at least one of a divalent linear or branched organic group of 20 to about 150 carbon atoms in units of 2 to 12 methylene groups and arylene groups of 6 to 10 carbon atoms separated by at least one of 1 to 50 catenary oxygen atoms and by 1 to 30 oxycarbonyl groups,

preferably at least one of 1 to 20 catenary oxygen atoms and by 1 to 10 oxycarbonyl groups, the organic group having a molecular weight of 400 to 2,500, preferably 600 to 1,000; or RD can be 2) an organic group selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group, a phenylenemethylenephenylene group, the organic group optionally being substituted by up to four lower alkyl groups having 1 to 4 carbon atoms and a total of up to 15 carbon atoms, which organic group can be chain extended by a transesterification reaction between a diol terminated ester precursor and a lower aliphatic diester of an aliphatic diacid having from 2 to 12 carbons or an aromatic diacid having from 8 to 12 carbons or reaction between a diol terminated ester precursor and an aliphatic lactone of 4 to 6 carbons; or RD can have 3) the structure $\{-R^1(X^1-R^2-X^1-R^1)_p-\}$ where p is an integer from 1 to 5, produced by the reaction of a polyol with an isocyanate having the structure OCN—$R^2$—NCO to produce a segment having a molecular weight of from 500 to 4,000, preferably 800 to 2,000;

$R^1$ can be a linear or branched alkylene group having 2 to 12 carbon atoms, or an arylene group having 6 to 10 carbon atoms;

$X^1$ can be

$R^2$ can be an organic group preferably selected from the group consisting of a linear or branched alkylene group having 2 to 12 carbon atoms, a cyclopentamethylene group, a cyclohexamnethylene group, a 5- or 6-membered azacyclic group, a phenylene group, a naphthalene group, a phenylenemethylenephenylene group, the organic group optionally being substituted by up to four lower alkyl groups having 1 to 4 carbon atoms and a total of at most 15 carbon atoms;

$X^2$ can be

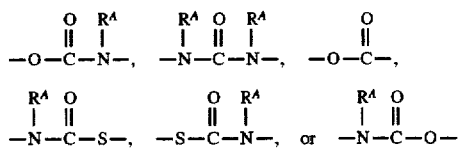

wherein $R^A$ can be hydrogen or lower alkyl having 1 to 4 carbon atoms;

$R^H$ can be a divalent hydrophobic group selected from divalent oligomeric siloxanes having the structure

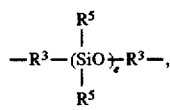

divalent organic groups having the structure

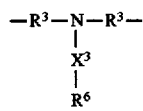

comprising a pendant alkyl group;

or divalent organic groups having one of the structures

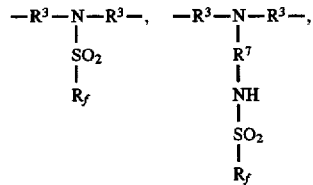

or quaternary salts thereof, wherein $R_f$ can be a fluorocarbon pendant group, as defined below; and $R^3$ can be a divalent organic group, preferably linear or branched alkylene group having 2 to 12 carbon atoms, but it can also be an arylene, such as phenylene or an alkarylene group, each having 6 to 20 carbon atoms;

$R^4$ can be a monovalent lower alkyl group having from 1 to 4 carbon atoms;

$R^5$ can be a monovalent group selected from the group consisting of alkyl groups of one to about twelve carbon atoms, aryl having 6 to 10 carbon atoms, or aralkyl groups having 6 to 10 carbon atoms, with at least 70% of $R^4$ being methyl;

e can be an integer of from about 10 to about 300;

$X^3$ can be a covalent bond, a carbonyl group,

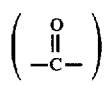

or an amide group

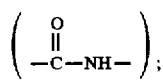

$R^6$ can be a monovalent group selected from the group consisting of alkyl groups of about 4 to about 60 carbon atoms, preferably 12 to 30 carbon atoms;

$R^7$ can be a divalent group selected from the group consisting of alkylene groups of 2 to about 12 carbon atoms; and $R_f$ can be a monovalent saturated fluoroaliphatic group having 6 to 12 carbon atoms, at least four of which are fully-fluorinated carbon atoms.

It is also understood that when the group $R^D$ (or its component groups $R^1$ and $R^2$) or the group $R^2$ contains branched alkylene components that these components constitute additional termini of the polymer or oligomer and as such, may themselves be terminated by at least one hydrolyzable silyl group.

The sulfopoly(ester-urethane) compositions of the present invention have a sulfonate equivalent weight of about 500 to 12,000 g per equivalent, preferably 2,000 to 10,000 g per equivalent. The sulfopoly(ester-urethane) compositions also preferably have a number average molecular weight 2,000 up to less than 50,000, preferably in the range of 2,000 to 20,000, more preferably 5,000 to 8,000.

Representive processes for the preparation of the sulfopoly(ester-urethane) compositions are schematically depicted in the Reaction Sequences, below.

Symmetric sulfodiacids or diesters are illustrated in the sequences for convenience. However, the skilled artisan will recognize that use of asymmetric sulfodiacids or diesters falls within the scope of the present invention.

REACTION SEQUENCE I
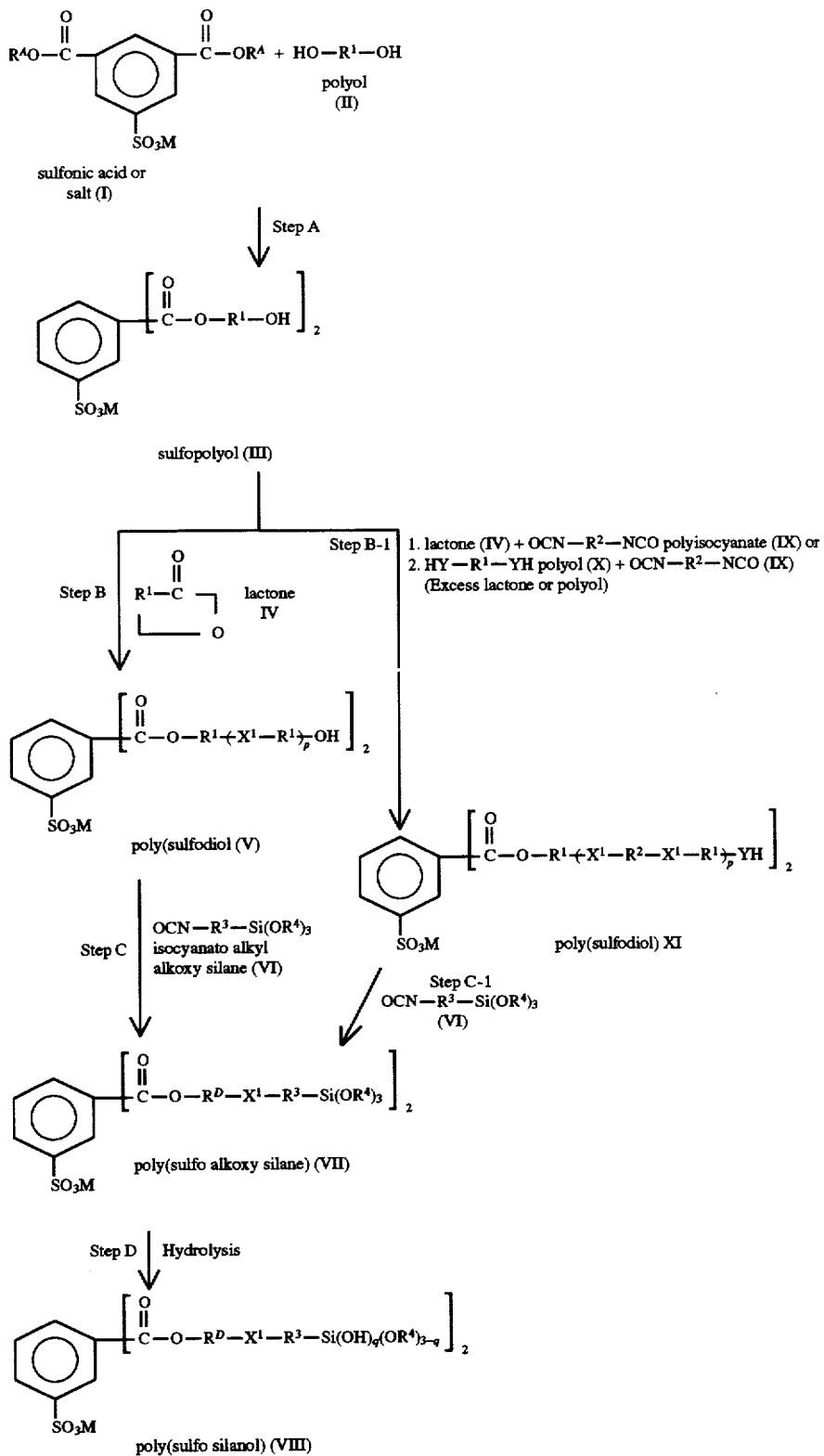

REACTION SEQUENCE II (part 1)
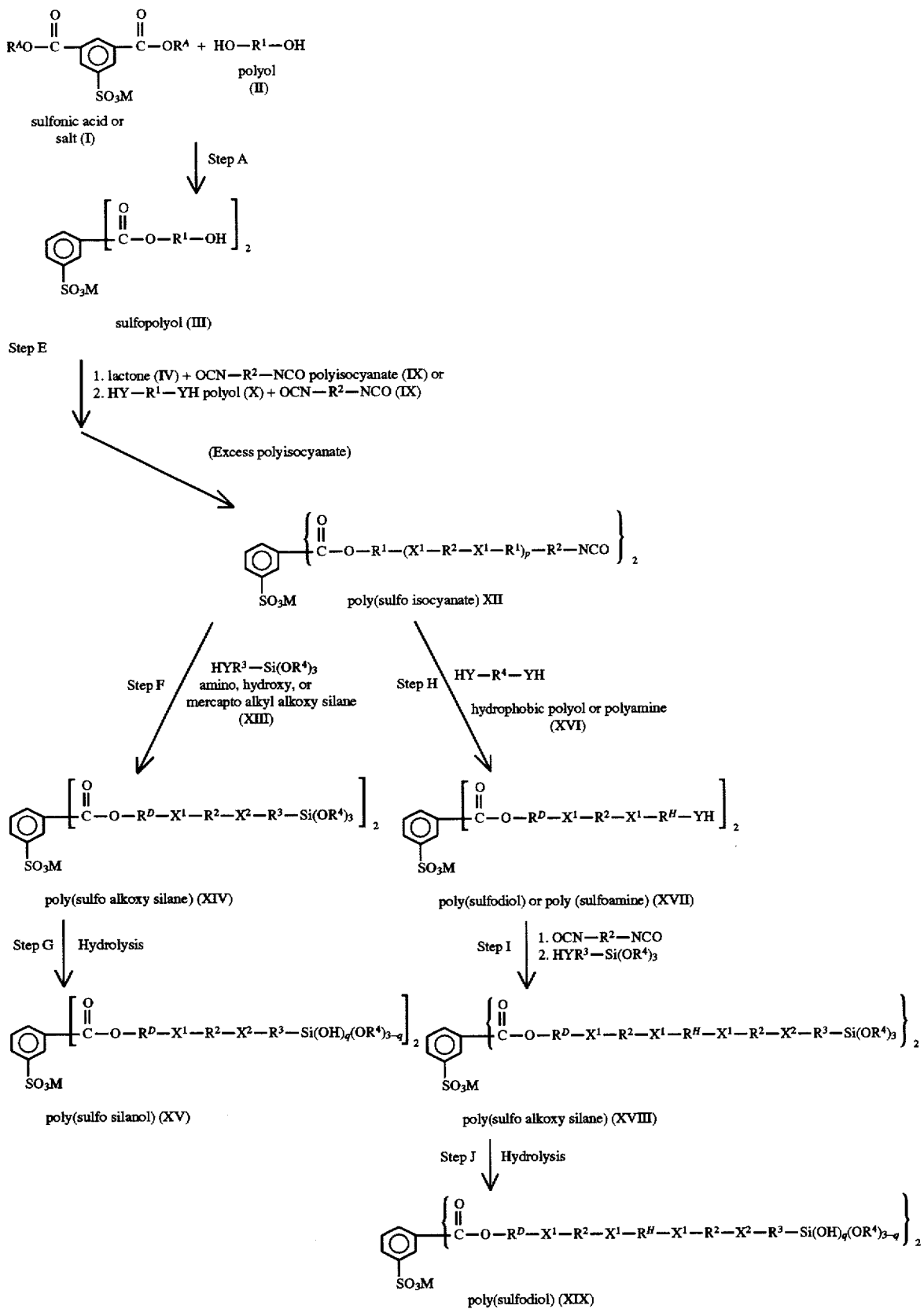

wherein Y=—O— or —S—, or NR⁴; wherein RA is as previously defined;

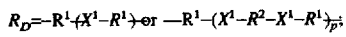

and R¹, R², R³, R⁴, R^H, X¹, X², and M are as previously defined, p is a number in the range of 1 to about 50; and q is a number 1 to 3.

The sulfopoly(ester-urethane) compositions of the invention and their corresponding hydrolyzed silanols can be prepared by a process comprising the steps (see Reaction Sequence, steps A, B, C, and D) of:

(a) (Step A) reacting a sulfonic acid or salt of formula (I) with a polyol to provide a sulfopolyol of formula (III);
(b) (Step B) reacting the sulfopolyol with a lactone (IV) to obtain a poly(sulfo diol) (V);
(c) (Step C) reacting, poly(sulfo diol) (V) with an isocyanato alkyl alkoxy silane (VI) in an inert organic solvent (i.e. tetrahydrofuran, methyl ethyl ketone, dichloroethane, etc.) to form an poly(sulfo alkoxy silane) (VII); and
(d) (Step D) hydrolyzing the poly(sulfo alkoxy silane) to form a poly(sulfo silanol) (VIII).

In an alternative Reaction Sequence, the poly (sulfosilanol) (VIII) is obtained as indicated in reaction sequence A,B-1,C-1, and D;

(a) (Step B-1) the sulfodiol (III) can be reacted with polyisocyanate (IX) and an excess of polyol (X) or lactone (IV) to form a poly(sulfodiol) (XI).
(b) (Step C-I) poly(sulfodiol) (XI) can be then reacted with isocyanato alkyl alkoxy silane (VI)to obtain poly(sulfo alkoxy silane) (VII); and,
(c) Step D hydrolyzing poly(sulfo alkoxy silane) (VII) to obtain poly(sulfo silanol) (VIII).

In yet another alternative, the poly(sulfo silanol) (XV) can be obtained according to the reaction sequence A, E, F, and G. In this sequence, The poly(sulfo isocyanate) (XII) can be obtained from the reaction of sulfopolyol (III) with polyol (X) or lactone (IV) and a excess of polyisocyanate (IX) as shown in Step E.

Poly(sulfoisocyanate) (XII) can subsequently be reacted with hydroxyalkyl alkoxy silane (XIII) or aminoalkyl alkoxy silane or mercaptoalkyl alkoxy silane to obtain poly(sulfo alkoxy silane) (XIV) and the hydrolyzed poly(sulfo silanol) (XV) according to steps F and G.

In a fourth alternative, polysulfo silanol (XIX) can be obtained according to reaction sequence A,E,H,I,J. In this alternative, poly(sulfo isocyanate) (XII) can be reacted with hydrophobic polyol (XVI) to obtain poly(sulfo polyol) (XVII), which is, in turn, converted to poly(sulfo alkoxy silane) (XVIII) and poly(sulfo silanol) (XIX).

Sulfoaryl-dicarboxylic acids useful for preparation of sulfopolyol (III) and subsequent derivatives are any of the known sulfoaryl-dicarboxylic acids. Examples of these include sulfoarenedicarboxylic acids such as 5-sulfoisophthalic acid, 5-sulfonaphthalene-1,4-dicarboxylic acid, 4,5-disulfonaphthalene- 1,8-dicarboxylic acid, and sulfofluorenedicarboxylic acids such as 9,9-di(2'-carboxyethyl)fluorene-2-sulfonic acid described in British Patent No. 1,006,579. It is understood that the corresponding lower alkyl esters, halides, anhydrides, and salts of the above sulfonic acids of formula (I) can also be used in the preparation.

Diisocyanates of formula (IX) that can be used to react with the sulfodiol of formula (III) to form the poly(sulfo isocyanates) (XI and XII) are any of the well-known diisocyanates. Preferred diisocyanates are hexamethylene diisocyanate, toluene diisocyanate, isophorone diisocyanate, 4,4'-diisocyanato-dicyclohexylmethane, 3,5,5-trimethyl-1-isocyanato-3-isocyanatomethylcyclohexane, and 4,4'-diphenylmethane diisocyanate (MDI). Other diisocyanates include those described in U.S. Pat. Nos. 3,700,643 and 3,600,359, among many others. Mixtures of diisocyanates can also be used such as a mixture of MDI and hexamethylene diisocyanate.

Isocyanate-terminated sulfopolyurethane compounds similar to structure XII are described in U.S. Pat. Nos. 4,558,149, 4,746,717, and 4,855,384, which are incorporated herein by reference. They are preferably prepared by the reaction of a sulfoarene or sulfoalkane dicarboxylic acid (or their esters), with two equivalents or more of polyols forming a mixture of sulfo-organic polyol and, in some cases, unreacted polyol. A range of 1.2 to 8 equivalents of polyol can be useful with three to five equivalents being preferred. The sulfo-organic polyol or its mixture with excess polyol is then reacted with excess organic diisocyanate (up to about 1 5 mole % excess).

Aliphatic or aromatic esterified sulfopolyols of formula (III) useful in preparing the isocyanate-terminated sulfopolyurethane compounds include ethylene glycol, propylene glycol, butylene glycol, hexamethylene glycol, cyclohexamethylenediol, branched chain diols such as neopentyl glycol and 1,4-(2,2,3,3-tetramethyl)butane diol, and the like. Examples of polymeric diols include the polyoxyalkylene diols, the polyester diols of organic dicarboxylic acids and diols, and the polylactone diols having a molecular weight of 62 to about 10,000. Examples of polymeric diols include polyoxyethylene diols such as the CarbowaxTM diols available from Union Carbide, Danbury, Conn., the polyoxytetramethylenediols such as Polymeg™ diols available from Quaker Oats Company, Chicago, Ill., the polyester diols such as the Multron™ poly(ethyleneadipate)diols available from Mobay Chemical Company, and the polycaprolactone diols such as the PCPTM diols available from Union Carbide.

Examples of polymeric aromatic polyols include the polyester diols that are prepared from aromatic dicarboxylic acids such as o-, m-, and p-phthalic acid and diols such as diethylene glycol, triethylene glycol, or glycol.

Preferred polyols are the esterified products of an aliphatic diol, such as butylene glycol and neopentyl glycol, and a lactone, preferably caprolactone.

The hydrophobic compounds of formula (XVI) can comprise polysiloxane groups, pendant higher alkyl groups, or fluorochemical groups as defined above. Examples of useful polysiloxanes include amino organic group-terminated polysiloxanes of the formula

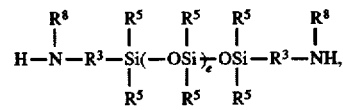

wherein R³ and R⁵ are as previously defined, and R⁸ is H—, CH₃—, C₂H₅—, or other lower alkyl groups. These are known compounds which can be prepared by the procedures disclosed in U.S. Pat. Nos. 4,098,742 and 5,091,483.

Organopolysiloxane diamines useful in preparing the hydrophobic compounds of formula (XVI) which can be a precursor of the poly(ester-urethane-urea) compositions of this invention are those for which e is an integer of about 10 to about 300, preferably about 10 to 100, wherein R³, R⁵, and R⁶ are as previously defined.

Hydroxyorganic group-functional polysiloxanes useful in preparing compounds of formula (XVI) are also known compounds and are described in U.S. Pat. Nos. 4,098,742, 4,898,918, and 5,128,408, which are incorporated herein by reference.

The hydrophobic compounds of formula (XVI) can also comprise amino organic group-terminated divalent organic groups having the structure

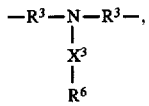

each having an alkyl pendant group, wherein $R^3$, $R^6$, and $X^3$ are as defined above. These are known compounds which can be prepared by the reaction of a blocked di(hydroxyalkyl)amine with a mono(higher alkyl) isocyanate wherein $R^3$ is as previously defined.

Alternatively, hydrophobic compounds of formula (XVI) can be prepared from divalent organic groups having one of the structures below or quaternary salts thereof:

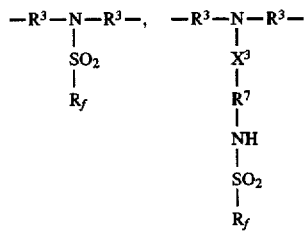

each comprising a fluorocarbon pendant group which can be prepared by the reaction of a perfluoroalkyl sulfonamide with ethylene chlorohydrin, wherein $R^3$, $R^7$ and $X^3$ are as defined above. $R_f$ is a saturated monovalent fluoroaliphatic group having at least four fully-fluorinated carbon atoms. $R_f$ can be straight, branched or, if sufficiently large, cyclic fluoroaliphatic group or combinations thereof, such as alkylcycloaliphatic radicals. The skeletal chain in the fluoroaliphatic radical can include catenary oxygen, hexavalent sulfur, and/or trivalent nitrogen atoms bonded only to carbon atoms of the skeletal chain, such hetero atoms providing stable linkages between fluorocarbon portions of the $R_f$ radical. A fully fluorinated radical is preferred, but hydrogen and chlorine atoms may be present as substituents provided that not more than one atom of each is present for every two carbon atoms. While $R_f$ can contain a large number of carbon atoms, compounds where Rf is not more than 20 carbon atoms will be adequate and preferred since larger radicals usually represent a less efficient utilization of the fluorine than is possible with shorter chains. Fluoroaliphatic radicals containing from about 6 to about 12 carbon atoms are most preferred. Generally $R_f$ will contain 40 to 78 weight percent fluorine. The terminal portion of the $R_f$ group preferably has at least four fully fluorinated carbon atoms, e.g. $CF_3CF_2CF_2CF_2$—, and the preferred compounds are those in which the $R_f$ group is fully or substantially completely fluorinated, as in the case where $R_f$ is perfluoroalkyl, e.g. $CF_3(CF_2)_m$—, wherein m can be an integer of 1 to 19. Suitable $R_f$ groups include, for example, $C_8F_{17}$—, $C_6F_{13}$—$CH_2CH_2$—, and $C_{10}F_{21}$—$CH_2CH_2$—.

In particular, Step A of the process for the preparation of polyurethane polymeric composition of the invention can be performed by the reaction of one or more sulfoalkane or sulfoarene dicarboxylic acids with an excess of 0.2 equivalents or more of polyol(s), this amount being in a range from 1.2 to 8 equivalents of polyol(s), preferably 3 to 5 equivalents, i.e., an amount that will provide to the sulfo-organic segment at least one sulfo group per about 800 to 10,000, preferably 1,200 to 2,000, of molecular weight. The sulfopolyol and excess polyol can then be reacted with excess polyisocyanate to form a isocyanate-terminated sulfopolyurethane, the amount of polyisocyanate being up to 15 mole % excess, preferably 1.2–10 mole % excess. The concentrations of the reactants in the solvent are adjusted so that the final reaction mixture has about 20 to 60 percent solids.

Also, in particular, Step H is performed by reacting up to one molar equivalent of amino- or hydroxy-group-functional hydrophobic compound relative to the isocyanate equivalent of the poly(sulfoisocyanate) (XII) formed by Step E. The reaction sequences are typically carried out in an inert solvent at a solids concentration of about 15 to 80%, preferably 25 to 60% in an inert water miscible solvent.

In another embodiment of the invention, the sulfopoly (ester-urethane)s can comprise alkylene sulfonic acid units in the polymer backbone. Such sulfopoly(ester-urethane)s typically are prepared using methods different from those described for the preparation of sulfopoly(ester-urethane)s comprising aromatic sulfonic acid units described above due to the lower thermal stability of hydroxy terminated dicarboxylic esters of alkyl sulfonic acids. Preferably, they can be prepared, however, by an alternative route involving the Michael addition of a bisulfite salt to an oligomer of an olefinic unsaturated dicarboxylic acid ester. These oligomers can be prepared from esters of olefinic unsaturated dicarboxylic acids using procedures similar to those described above. Subsequent Michael addition of a bisulfite salt to the olefinic unsaturation in the presence of a free radical initiator will produce an oligomer comprising the salt of alkyl sulfonic acid units in the oligomer backbone.

Olefinic dicarboxylic acids suitable for preparing sulfopoly(ester-urethane)s of the present invention include, but are not limited to, maleic acid, fumaric acid, itaconic acid, and unsaturated diol polyfunctional fatty acids (i.e., castor oil, etc.) or triglycerides of ricinoleic acid.

Release coatings of the present invention can be applied as dispersions or solutions to substrates such as, for example, poly(ethylene terephthalate), cellulosic films, poly carbonate, metals, ceramics, glass, synthetic and natural fibers, etc., to prevent the adherence of various materials and to be used as release coatings for adhesive roll and sheet materials, e.g., adhesive tapes.

Objects and advantages of this invention are further illustrated by the following examples, but the particular materials and amounts thereof recited in these examples, as well as other conditions and details, should not be construed to unduly limit this invention.

The following reaction sequence and typical experimental procedures will serve to clarify the synthesis of the silyl terminated poly(ester-urethane) compositions of the instant invention. "Me" means methyl and "Bu" means butyl. Preparation of the sulfonated diol PCPSSIP shown below is described in greater detail in U.S. Pat. No. 4,558,149, incorporated herein by reference.

Preparation of PCPSSIP Precursor

A mixture of dimethyl 5-sodiosulfoisophthalate (DMSSIP, 25.1 kg, 85 mol, available from E.I. DuPont de Nemours, Wilmington, Del.), polycaprolactonediol (PCP 0200, average molecular weight 514, 131 kg, 255 mol, available from Union Carbide Corp., Danbury, Conn.), and tetrabutyl titanate (78 g, 0.23 mol, available from Aldrich Chemical Co., Milwaukee, Wis.) was heated at 230° C. for four hours and the methanol by-product of the reaction was distilled from the reaction. After cooling to ambient temperature, an oily product comprising an approximately equal molar mixture of PCPSSIP and unreacted PCP 0200 was obtained. Reaction Sequence III shows the chemical equations involved.

The mixed PCPSSIP Precursor had a nominal hydroxy equivalent weight of about 500 g/mole (generally in the range of 450 to 600 g/mole). The hydroxy equivalent weight for the mixed precursor can vary depending on reaction conditions (e.g., temperature, rate of methanol removal, catalyst, etc.).

In the following examples, "PCPSSIP precursor" means the mixture of PCPSSIP and PCP 0200. Unless otherwise noted, the molar ratio of PCPSSIP to PCP 0200 is approximately 1.0. In Example 2, the PCPSSIP precursor was prepared using zinc acetate (0.24 wt% based on diol charge) instead of tetrabutyl titanate.

In all structures in this application, including those shown for PCP 0200 and PCPSSIP, the numbers outside the brackets refer to the average number of units.

Example 1

The mixed PCPSSIP precursor prepared as described above except as a 1 to 0.87 molar mixture of PCPSSIP and PCP 0200 (649.8 g, 0.64 mol based on a hydroxyl equivalent weight of 509 for the mixture), additional PCP 0200 (599.4 g, 1.16 mol), ethylene glycol (89.4 g, 1.44 mol, available from J. T. Baker, Inc., Phillipsburg, NJ), and methyl ethyl ketone (1338 mL) was heated to 85° C. and dried by distilling methyl ethyl ketone (445 mL) from the mixture. After cooling to ambient temperature, dibutyltin dilaurate (1.53 g, 2.4 mmol, available from Alfa Chemical Co., Ward Hill, Mass.) was added to the dried solution. The dried solution was added, with stirring, to a solution of isophorone diisocyanate (800.2 g, 3.60 mol, available from Huls America, Inc. Piscataway, N.J.) in methyl ethyl ketone (533 mL), which had been heated to 72° C., at such a rate that the temperature of the reaction mixture did not exceed 85° C.. After 1 hour, additional dibutyltin dilaurate (1.53 g) in methyl ethyl ketone (50 mL) was added to the solution, and the reaction mixture was maintained at 80° C., with stirring, for an additional 3.5 hours. A solution of 3-aminopropyltriethoxysilane (159.4 g, 0.72 mol, available from Aldrich Chemical Co.) in methyl ethyl ketone (100 mL) was then added to the reaction mixture which was maintained at 80° C., with stirring, for an additional 45 minutes. Water (2 L), at 80° C., was added to the reaction mixture over about a one-hour period with vigorous stirring and methyl ethyl ketone was subsequently distilled from the mixture under reduced pressure to produce a dispersion (54% solids) of a silanol terminated poly(ester-urethane) in water. Modulated Differential Scanning Calorimetry (MDSC) and tensile properties analyses made of a spun cast film of the dispersion indicated that the polymer had a Tg of 26° C. and a tensile strength of 17.9 MPa (2595 psi) at 587% elongation.

Example 2

A silanol terminated sulfopoly(ester-urethane) was prepared substantially according to the procedure of Example 1 except that the reactants were charged as follows:

The mixed PCPSSIP precursor (37.6 g, 0.04 mol), PCP 0201 (52.4 g, 0.10 mol) (polycaprolactam diol, available from Union Carbide), ethylene glycol (7.44 g, 0, 12 mol), and isophorone diisocyanate (62.2 g, 0.28 mol). The molar ratio of the reactants was 1:6:6:14. Modulated Differential Scanning Calorimetry (MDSC) and tensile properties analyses made of a spun cast film of the polymer produced by this reaction sequence indicated that the polymer had a Tg of 17° C. and a tensile strength of 30.6 MPa at 653% elongation.

In Examples 3–5, below, the isocyanate utilized was bis(4-isocyanatohexyl)methane.

Example 3

A silanol terminated sulfopoly(ester-urethane) was prepared substantially according to the procedure of Example 1 except that the reactants were charged as follows:

The mixed PCPSSIP precursor (53.3 g, 0.06 mol), PCP 0201 (47.7 g, 0.09 mol), ethylene glycol (3.7 g, 0.06 mol) and bis(4-isocyanatocyclohexyl)methane (62.9 g, 0.24 mol, $H_{12}MDI$, available from Bayer Corp., Pittsburgh, Pa.). The molar ratio of the reactants was 1:4:2:8. Modulated Differential Scanning Calorimetry (MDSC) and tensile properties analyses made of a spun cast film of the polymer produced by this reaction sequence indicated that the polymer had a Tg of 14° C. and a tensile strength of 14.7 MPa at 502% elongation.

Example 4

A silanol terminated sulfopoly(ester-urethane) was prepared substantially according to the procedure of Example 1 except that the reactants were charged as follows:

The mixed PCPSSIP precursor (56.9 g, 0.06 mol), PCP 0201 (63.6, 0.12 mol), ethylene glycol (9.3 g, 0.15 mol) and bis(4-isocyanatocyclohexyl)methane (94.3 g, 0.36 mol). The molar ratio of the reactants was 1:5:5:12. Modulated Differential Scanning Calorimetry (MDSC) and tensile properties analyses made of a spun cast film of the polymer produced by this reaction sequence indicated that the polymer had a Tg of 36° C. and a tensile strength of 17.4 MPa at 390% elongation.

Example 5

A silanol terminated sulfopoly(ester-urethane) was prepared substantially 30 according to the procedure of Example 1 except that the reactants were charged as follows:

The mixed PCPSSIP precursor (53.3 g, 0.06 mol), PCP 0201 (15.9 g, 0.03 mol), ethylene glycol (7.45 g, 0.12 mol) and bis(4-isocyanatocyclohexyl)methane (62.9 g, 0.24 mol). The molar ratio of the reactants was 1:2:4:8. Modulated Differential Scanning Calorimetry (MDSC) and tensile properties analyses made of a spun cast film of the polymer produced by this reaction sequence indicated that the polymer had a Tg of 80° C. and a tensile strength of 18.2 MPa at 111% elongation.

The following example teaches the preparation and reaction of a sulfonated polyester diol other than PCPSSIP.

Example 6

A mixture of DMSSIP (74.0 g, 0.25 mol), 1,4-cyclohexanedimethanol (180 g, 1.25 mol, available from Aldrich Chemical Co.), and tetrabutyl titanate (0.1 g, 0.3 mmol) was heated to 200° C. and maintained at that temperature, with stirring, for four hours, and then cooled to 150° C. where it was maintained, with stirring, for an additional five hours. The temperature of the reaction mixture was then increased to 180° C. and ε-caprolactone (228 g, 2.0 mol, available from Aldrich Chemical Co.) containing dibutyltin dilaurate (0.2 g, 0.3 mmol) was added to the reaction mixture, with stirring, over a period of 30 minutes. The mixture was maintained at 180° C., with stirring, for three hours and then cooled to room temperature, to produce an oily precursor composition comprising a 1:3 molar ratio of a sulfonated diol and a diol resulting from the reaction of 1,4-cyclohexanedimethanol (1 part) with F-caprolactone (2 parts). The thus prepared precursor was converted to a silanol terminated sulfopoly(ester-urethane) substantially according to the procedure of Example 1 by reacting 55.9 g of the precursor with PCP 0201 (62.9 g, 0.12 mol), ethylene glycol (5.58 g, 0.09 mol), isophorone diisocyanate (79.9 g, 0.36 mol) followed by reaction with aminopropyltriethoxy silane (11.7 g, 0.053 mol). Modulated Differential Scanning Calorimetry (MDSC) and tensile properties analyses made of a spun cast film of the polymer produced by this reaction sequence indicated that the polymer had a Tg of 29° C. and a tensile strength of 28.6 MPa at 341% elongation.

The following Example teaches the practice of the invention by the embodiment of first preparing a hydroxyl terminated poly(ester-urethane), reaction of this hydroxyl terminated poly(ester-urethane) with an electrophilic alkoxy silane reagent, and reaction of the alkoxy silane terminated poly(ester-urethane) with an electrophilic alkoxy silane reagent, and reaction of the alkoxy silane terminated poly (ester-urethane) with water.

Example 7

A mixture of PCPSSIP precursor (57.33 g, 0.06 mol, with a hydroxy equivalent weight of 475), PCP 0201 (62.76 g, 0.12 mol, available from Union Carbide Corp.), ethylene glycol (9.32 g, 0.15 mol) and dibutyltin dilaurate (0.16 g, 0.25 mmol) in methyl ethyl ketone (85 mL) was heated to 80° C. and a solution of isophorone diisocyanate (66.69 g, 0.3 mol) in methyl ethyl ketone (44 mL) added to the mixture, with stirring, at a rate such that the reaction temperature did not exceed 80° C.. Approximately 30 minutes subsequent to the completion of the addition of the isophorone diisocyanate solution, dibutyltin dilaurate (0.16 g) in methyl ethyl ketone (I mL) was added to the reaction mixture and the reaction maintained at 80° C., with stirring, for an additional 3.5 hours. A solution of isocyanatopropyltriethoxy silane (14.82 g, 0.06 mol, available from Huls America, Inc.) in methyl ethyl ketone (5 mL) was added to the reaction mixture and the mixture maintained at 80° C., with stirring, for approximately one hour. (Infrared analysis (2250 cm$^{-1}$) of the reaction mixture at this point indicated no residual isocyanate remained.) Water (260 mL) was added to the reaction mixture, with stirring, over a period of approximately ten minutes and the methyl ethyl ketone was distilled from the mixture under reduced pressure to produce a dispersion of a silanol terminated sulfopoly(ester-urethane). Modulated Differential Scanning Calorimetry (MDSC) and tensile properties analyses made of a spun cast film of the polymer produced by this reaction sequence indicated that the polymer had a Tg of 7° C. and a tensile strength of 17.9 MPa at 295% elongation.

Example 8

A silyl terminated sulfopoly(ester-urethane) was prepared as follows:

A bis-(propylamino) terminated polysiloxane having an average molecular weight of approximately 5,000 was prepared as follows:

A solution of bis(3-aminopropyl) tetramethyl disiloxane (14.96 g, 0.06 moles, available from Aldrich Chemical Co.) in octamethylcyclotetra-siloxane (352.9 g, available from General Electric Co.) was purged with argon for 20 minutes, followed by heating the solution to 150° C., adding 0.06 g of a 50% solids (w/w) aqueous cesium hydroxide solution and maintaining the resulting reaction mixture of 150° C. for an additional 6 hours. The reaction mixture was then cooled to 70° C., neutralized with excess triethyl amine and acetic acid, and heated to 130- 160° C. under 10 mm Hg vacuum for at least 5 hours to remove cyclic siloxanes. An bis-(propylamino) terminated polysiloxane having a theoretical molecular weight of 5,000 was obtained after the reaction mixture was cooled to ambient temperature and filtered to remove cesium acetate.

An aliquot of the 1:5:5:12 isocyanate terminated sulfopoly(ester-urethane) (44.37 g of a 65.4% solids solution in MEK, 0.01 mol isocyanate) was provided from Example 4, above, and was diluted with MEK (31 g). To this solution was added a mixture of the above described bis-(propylamino) terminated polysiloxane (6.25 g, 0.0025 mol amine) and aminopropyl trimethoxysilane (1.66 g, 0.0025 mol amine) in MEK (10.8 g), with stirring. The reaction mixture was stirred at ambient temperature for approximately 10 minutes, after which it was heated to 50° C. and water (10 g) was added to the mixture. After approximately one hour at 50° C., additional water (147.6 g) was added to the reaction mixture to produce a dispersion of the hydrolyzed sulfo poly(ester-urethane) in MEK/water. MEK was subsequently distilled from the dispersion to produce an approximately 20% solids dispersion of the hydrolyzed sulfo poly(ester-urethane) in water. A portion of the dispersion was coated on a poly(ethyleneterephthalate) (PET) film and the coating dried at 80° C. in a circulation air oven for approximately 5 minutes to produce a clear release coating on the PET film. SCOTCH™ Brand filament tape (#898, available from 3M, St. Paul, Minn.) or SCOTCH™ Brand masking tape (#232, available from 3M) exhibited substantially no adhesion to the coating while SCOTCH™ Brand Magic Mending Tape (3M) exhibited very low adhesion to the coating. The integrity of the coating, or lack of transfer to the adhesive, was demonstrated by folding the tape test strips over on themselves to produce adhesive/adhesive contact, and then attempting to separate the thus created bond. In all cases, the strength of the adhesive/adhesive bond was qualitatively judged to be substantially the same as the bond strength of a control sample which had not been applied to the coating.

Various modifications and alterations of this invention will become apparent to those skilled in the art without departing from the scope and spirit of this invention, and it should be understood that this invention is not to be unduly limited to the illustrative embodiments set forth herein.

We claim:

1. A water-dispersible sulfopoly(ester-urethane) composition comprising in its backbone at least one arylene or alkylene sulfonic acid group or a salt thereof, the arylene or alkylene portion of said sulfonic acid g-roup or salt thereof comprising two ester groups covalently bonded thereto, the polymer being terminated by at least one hydrolyzable silyl group.

2. The composition according to claim 1 further comprising 40 or more weight percent water or aprotic liquid, based on the weight of the total composition, to provide a dispersion of said composition in said liquid.

3. The composition according to claim 1 having a sulfonate equivalent weight in the range of about 500 to about 12,000 g/equivalent.

4. The composition according to claim 1 having a number average molecular weight in the range of 2,000 to less than 50,000.

5. The composition according to claim 4 having a number average molecular weight in the range 2,000 to 20,000.

6. A sulfopoly(ester-urethane) composition comprising the structural formula

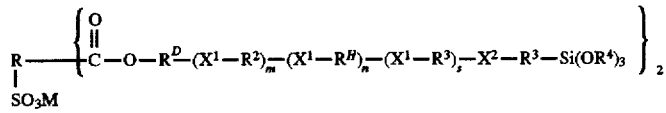

wherein

R is a $C_6$–$C_{12}$ aryltrlyl group(trivalent aryl group) in which M is a cation.

$R^D$ can be 1) at least one of a divalent linear or branched organic group of 20 to about 150 carbon atoms In units of 2 to 12 methylene groups and arylene groups of 6 to 10 carbon atoms separated by at least one of 1 to 50 catenary oxygen atoms and by 1 to 30 oxycarbonyl groups,

or $R^D$ can be 2) an organic group selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group, a phenylenemethylenephenylene group, or $R^D$ can have 3) the structure {—$R^1$—($X^1$—$R^2$—$X^1$—$R^1$)$_p$—} where p is an integer from 1 to 5, produced by the reaction of a polyol with an isocyanate having the structure OCN-$R^2$-NCO to produce a segment having a molecular weight of from 500 to 4,000, preferably 800 to 2,000;

$R^1$ is linear or branched alkylene group having 2 to 12 carbon atoms or an arylene group having 6 to 10 carbon atoms;

$X^1$ is

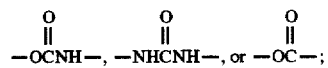

$R^2$ is an organic group preferably selected from the group consisting of a linear or branched alkylene group having 2 to 12 carbon atoms, a cyclopentamethylene group, a cyclohexamethylene group, a 5- or 6-membered azacyclic group, a phenylene group, a naphthalene group, a phenylenemethylenephenylene group, s=0 or 1, n=0 or 1, m=0 or 1, with the proviso that at least one of n or m is 1;

$X^2$ is

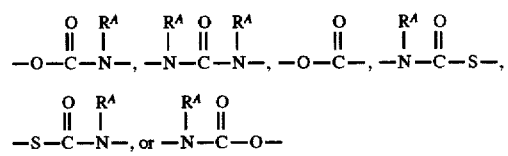

wherein $R^A$ can be hydrogen or lower alkyl having 1 to 4 carbon atoms;

$R^H$ is a divalent hydrophobic group selected from divalent oligomeric siloxanes having the structure

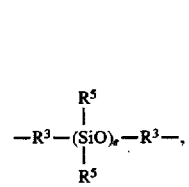

divalent organic groups having the structure

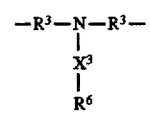

comprising a pendant alkyl group;

or divalent organic groups having one of the structures

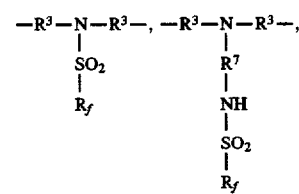

or quaternary salts thereof, wherein $R_f$ is a fluorocarbon pendant group, as defined below;

wherein $R^3$ is a divalent organic group selected from the group consisting of linear or branched alkylene group having 2 to 12 carbon atoms, arylene or alkarylene groups, each having 6 to 20 carbon atoms;

$R^4$ is a monovalent lower alkyl group having from 1 to 4 carbon atoms;

$R^5$ is a monovalent group selected from the group consisting of alkyl groups of one to about twelve carbon atoms, aryl having 6 to 10 carbon atoms, or aralkyl groups having 6 to 10 carbon atoms, with at least 70% of $R^4$ being methyl;

e is an integer of from about 10 to about 300;

$X^3$ is a covalent bond, a carbonyl

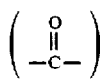

group, or an amide group

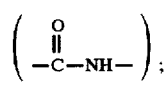;

$R^6$ is a monovalent group selected from the group consisting of alkyl groups of about 4 to about 60 carbon atoms, $R^7$ is a divalent group selected from the group consisting of alkylene groups of 2 to about 12 carbon atoms; and $R_f$ is a monovalent saturated fluoroaliphatic group having 6 to 12 carbon atoms, at least four of which are fully-fluorinated carbon atoms.

7. The composition according to claim 6 wherein M is hydrogen, a metal cation, or a quaternary ammonium cation.

8. The composition according to claim 6 wherein $R^D$ is a divalent linear or branched organic group comprising methylene groups and arylene groups separated by any of 1 to 20 catenary oxygen atoms and 1 to 10 oxycarbonyl groups.

9. The composition according to claim 6 wherein $R^D$ is an organic group which is substituted by up to four lower alkyl groups having 1 to 4 carbon atoms and a total of up to 15 carbon atoms.

10. The composition according to claim 6 wherein RD is chain extended by a transesterification reaction between (a) a diol terminated ester precursor and (2) a lower aliphatic diester of an aliphatic acid or an aliphatic lactone.

11. The composition according to claim 6 wherein $R^2$ is substituted by up to four lower alkyl groups having 1 to 4 carbon atoms and a total of at most 15 carbon atoms.

12. The composition according to claim 6 wherein $R^H$ is said oligomeric siloxane.

13. The composition according to claim 6 wherein $R^H$ is said divalent organic group comprising a pendant alkyl group.

14. The composition according to claim 7 wherein $R^H$ is said divalent organic group having a pendant fluorocarbon group.

15. The composition according to claim 6 which has been hydrolyzed to produce a poly(sulfo silanol) having any of the formulae VIII, XV, XIX:

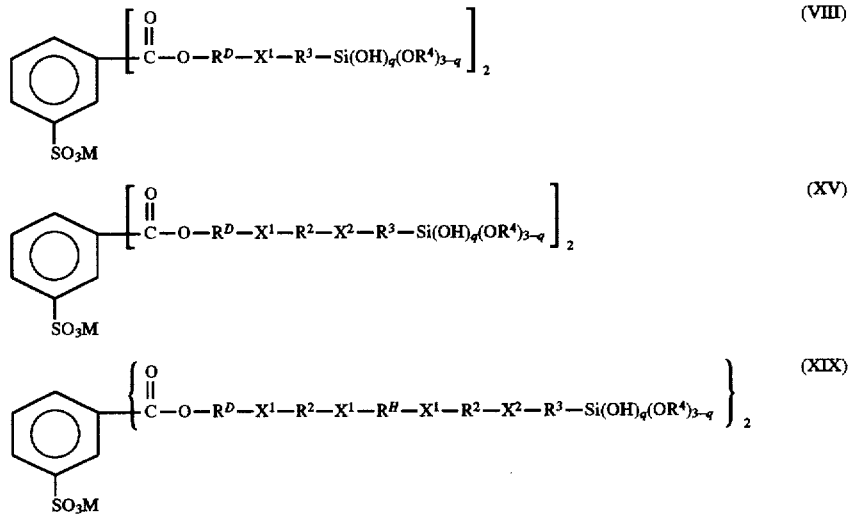

wherein M, $R^D$, $X^1$, $X^2$, $R^2$, $R^3$, and $R^4$ are as previously defined; and q is a number from 1 to 3.

16. An article comprising a substrate bearing a layer of the poly(ester-urethane) according to claim 1 on at least one surface thereof.

17. The article according to claim 16 wherein said composition exhibits release characteristics toward adhesive materials.

18. The article according to claim 17 which is an adhesive tape.

19. The article according to claim 16 wherein said substrate is selected from the group consisting of cellulosics, polyethyleneterephtlhalates, polycarbonates, metals, ceramics, glasses, and fibers.

20. The composition according to claim 1 wherein said composition exhibits release characteristics towards adhesive materials, grease, and oils.

* * * * *

UNITED STATES PATENT AND TRADEMARK OFFICE
CERTIFICATE OF CORRECTION

PATENT NO.: 5,756,633
DATED: May 26, 1998
INVENTOR(S): Wayne K. Larson

It is certified that error appears in the above-identified patent and that said Letters Patent is hereby corrected as shown below:

Col. 2, Line 18 and 19, "hydrophilic segment" should start a new paragraph
Col. 2, Line 22 and 23, "hydrophobic seg-ment" should start a new paragraph
Col. 3, Line 65, "RD" should read -- $R^D$ --
Col. 4, Line 19, "RD" should read -- $R^D$ --
Col. 4, Line 59, "RD" should read -- $R^D$ --
Col. 5, Line 9, "cyclohexamnethylene" should read -- cyclohexamethylene --
Col. 6, Line 37, "terrnini" should read - termini --
Col. 9, Line 6, "In the formula, Step E
Col. 9 – 10, Under REACTION SEQUENCE II (part 1) Step E
   Replace Step E of the formula with the following:

--

Step E 1. lactone (IV) + OCN—$R^2$—NCO polyisocyanate (IX) or
2. HY—$R^1$—YH polyol (X) + OCN—$R^2$—NCO (IX)

(Excess polyisocyanate)

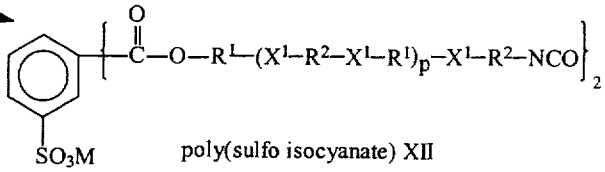

poly(sulfo isocyanate) XII

--

UNITED STATES PATENT AND TRADEMARK OFFICE
CERTIFICATE OF CORRECTION

PATENT NO.: 5,756,633
DATED: May 26, 1998
INVENTOR(S): Wayne K. Larson

It is certified that error appears in the above-identified patent and that said Letters Patent is hereby corrected as shown below:

Col. 11, Line 1, "RA" should read -- $R^A$- --
Col. 11, Line 5, "$R_D$" should read -- $R^D$ --
Col. 12, Line 19, "1 5 mole" should read -- 15 mole --
Col. 12, Line 30, "CarbowaxTM" should read -- Carbowax$^{TM}$ --
Col. 12, Line 36, "PCPTM" should read -- PCP$^{TM}$ --
Col. 13, Line 47, "Rf" should read -- $R_f$ --
Col. 16, Line 3, "0. 12 mol" should read -- 0.12 mol --
Col. 16, Line 39, "ofthe" should read -- of the --
Col. 16, Line 49, "substantially 30 according" should read -- substantially according --
Col. 17, Line 15, "F-caprolactone" should read -- ε-caprolactone --
Col. 18, Line 9, "bis-(propylamino)" should read -- *bis*-(propylamino) --
Col. 18, Line 24, "bis-" should read -- *bis*- --
Col. 18, Line 34, "bis-" should read -- *bis*- --
Col. 19, Line 9, "g-roup" should read -- group --
Col. 19, Line 36, "aryltrlyl" should read -- aryltriyl --
Col. 19, Line 39, "atoms In units" should read -- atoms in units --
Col. 22, Line 8, "RD" should read -- $R^D$ --
Col. 22, Line 61, "polyethyleneterephtlhalates" should read -- polyethyleneterephthalates --

Signed and Sealed this

Twenty-seventh Day of October, 1998

BRUCE LEHMAN

Attest:

Attesting Officer

Commissioner of Patents and Trademarks